(12) United States Patent
Haselhoff (10) Patent No.: US 9,781,876 B2
(45) Date of Patent: Oct. 10, 2017

(54) METERING UNIT FOR GRANULAR MATERIAL

(71) Applicant: Horsch Maschinen GmbH, Schwandorf (DE)

(72) Inventor: Alexander Haselhoff, Schwandorf (DE)

(73) Assignee: HORSCH MASCHINEN GMBH (DE)

( * ) Notice: Subject to any disclaimer, the term of this patent is extended or adjusted under 35 U.S.C. 154(b) by 78 days.

(21) Appl. No.: 14/828,960

(22) Filed: Aug. 18, 2015

(65) Prior Publication Data

US 2016/0044860 A1    Feb. 18, 2016

(30) Foreign Application Priority Data

Aug. 18, 2014  (DE) .................. 10 2014 111 777

(51) Int. Cl.
*A01C 7/04*    (2006.01)
*A01C 7/12*    (2006.01)

(52) U.S. Cl.
CPC ............. *A01C 7/128* (2013.01); *A01C 7/04* (2013.01)

(58) Field of Classification Search
CPC .. A01C 7/04; A01C 7/00; A01C 7/128; A01C 7/127; A01C 7/12; A01C 7/08
See application file for complete search history.

(56) References Cited

U.S. PATENT DOCUMENTS

| 7,228,807 B1 | 6/2007 | VenHuizen |
| 8,850,997 B2 | 10/2014 | Silbernagel et al. |
| 2015/0163991 A1 | 6/2015 | Funck |

FOREIGN PATENT DOCUMENTS

| DE | 3633955 A1 | 5/1987 |
| DE | 3831042 A1 | 3/1989 |
| DE | 19544237 | 8/1996 |
| DE | 19544237 A1 | 8/1996 |
| EP | 0636306 A1 | 2/1995 |
| WO | WO 2012142607 A1 * | 10/2012 ............ A01C 7/046 |
| WO | 2013/186175 A1 | 12/2013 |

OTHER PUBLICATIONS

German Search Report dated Apr. 27, 2015 in corresponding German application No. 102014111777.8.
Submitted herewith is a verified, non-mechanical translation of German patent reference No. 19544237 A1.

* cited by examiner

*Primary Examiner* — Christopher J Novosad
(74) *Attorney, Agent, or Firm* — Erickson Kemell IP, LLC (57) ABSTRACT

A metering unit for granular material includes a conveyor disk driven by a drive motor and rotating approximately concentrically to an inner cover surface of a housing. The conveyor disk has a recess for the reception of at least one grain to be separated via at least one revolution of the conveyor disk. In the interaction with a groove-shaped and/or slanted profile of the inner cover surface, the recess forms a conveyor pocket for conveying one grain or a plurality of grains in the direction toward an outlet opening extending approximately tangentially from the inner cover surface. For varying an axial distance to the inner cover surface and/or a width of the conveyor pocket, the conveyor disk, which is rotationally fixedly connected with the drive motor, is adjustable in the axial direction of the drive motor.

14 Claims, 6 Drawing Sheets

METERING UNIT FOR GRANULAR MATERIAL

CROSS-REFERENCE TO RELATED APPLICATIONS

This application claims priority from German Application No. DE 10 2014 111 777.8 filed Aug. 18, 2014, the contents of which are incorporated herein by this reference.

BACKGROUND OF THE INVENTION

The present invention relates to a metering unit for granular material.

Besides so-called single grain sowing units, distribution devices for granular material or sowing devices that operate volumetrically are known in numerous embodiments. In particular, grain conveyance can, in this context, be carried out by means of an airflow carrying the grains. By the metered feeding of the grains into the airflow, it is possible to vary the volumetric flow of sowed grains. Nevertheless, the grains are often deposited unevenly at the seed drill coulters, as both the precision of the grain metering and the regulation of the airflow can only be influenced to a certain extent, which leads to disadvantages in the growing space allocated to the individual plants.

A device for separating and discharging granular material that is universally applicable for different grain sizes and seed types is known from DE 36 33 955 A1. For this purpose, a rotating, slender hollow cylinder with recesses forming cells at its open front end, a stationary outer cover, and a cover ring arranged within the hollow cylinder are proposed. A storage hopper is separated by a wall from the hollow cylinder, which wall has an opening for the passage of a limited quantity of material to be separated. The length of one of the recess forming cells should equal the length of two or more grains to be separated. Furthermore, a suction opening is provided close to the rear boundary surface of the recesses. The fast rotating hollow cylinder picks up a few grains from the grain supply with each recess such that the outer cover covers the recesses in the filling section and prevents the grains from falling out. The centrifugal force presses the grains into the recesses, while a brush wiper provides for excess grains to be wiped off and fall back into the supply. An outer boundary wall ends in the further course of movement of the hollow cylinder such that grains that are not retained in the recesses by the suction pressure are released outward by centrifugal forces and are fed back into the supply. An additional pneumatic wiper can support this grain separation. At the point of release, the negative pressure is cut off such that the grains are released from the recesses by centrifugal force and gravitational force.

Furthermore, EP 0 636 306 A1 discloses a distribution device for granular material, such as seeds. The distribution device comprises a housing with an inner cover surface taking the form of a circular path, an inlet opening for granular material, a conveyor device for the granular material, which conveyor device rotates concentrically in the housing, and also an outlet opening. In its outer area, the conveyor device has a plurality of openings, which, in a first housing section and together with the inner cover surface of the housing, form a pocket, into which the grains are pushed and circularly conveyed by centrifugal forces supported by the conveyor device. The inlet opening leads into a second housing section. The first housing section and the second housing section are separated by a stationary, contoured disk. The contour of the disk is intended to provide for wiping off excess grains that are being transported in the pockets of the conveyor device. These grains are then available for conveyance again.

The mentioned metering devices are either modified single grain sowing units, which, although they do allow precise grain separation are, however, limited in their processing capacity and in their grain volume flow in comparison to volumetrically metering seed-drill machines and/or are relatively elaborate and prone to failure regarding their structure and their mode of operation. The additional devices that have become known, which are intended to improve the even release of the seeds in volumetrically metering machines, however, do not reach the separation quality of conventional single grain sowing units.

WO 2013/186175 A1, finally, discloses a distribution device for granular material, which distribution device can be employed, in particular, as a sowing unit in a sowing machine. This known unit comprises a housing with an inner cover surface taking approximately the form of a circular path and/or of a circle segment. Rotating concentrically in the housing is a disk-shaped conveyor device for the conveyed granular material or the conveyed seeds, as the case may be. An outlet opening extends approximately tangentially to the inner cover surface of the housing. At its outer periphery, the disk-shaped conveyor device has openings or shoulders, which in connection with the rotation of the disk and with the airflow provide for the circular movements of the grains along the inner cover surface. In a separating section, only one single grain remains in each opening or at each shoulder, as the case may be, of the disk-shaped conveyor device by means of the adjusted contour of the inner cover surface of the housing and under the influence of centrifugal forces, while the excess grains are discharged and fed back into the first housing section for being conveyed again.

The last mentioned sowing unit has proven successful in practice and enables precise grain separation in volumetric grain conveyance, however, it requires accurate adjustment of the recesses or openings located along the periphery of the rotating conveyor disk to the respective grain type being conveyed and sowed. When relatively small grains are conveyed in openings that are too large-sized, it is hardly possible to separate them precisely, as there will frequently be two, three, or more grains being conveyed in each opening and being released at the same time through the outlet opening. If, in contrast, the openings or recesses are too small, the separating unit will completely fail and will release the grains just as unevenly as they were previously transported into the inlet opening. In order to prevent these problems, it is inevitable in practice to exchange the conveyor disk rotating in the housing when changing the type of grains and to replace it for accordingly appropriately sized disks. As a multi-row sowing machine has a separate metering unit of the construction type described for each seed drill coulter, a corresponding number of sets of replaceable metering disks are required, which not only causes costs, but also requires a high logistic effort from the respective user.

DE 38 31 042 A1 further discloses a device for the axial shifting of a machine part being rotatable in relation to a stationary machine body. A threaded bushing is rotatably arranged at the stationary machine body. In this instance, a bearing of the rotatable machine part is axially fixed by an outer layer, and the inner layer of the bearing is fixed on the rotatable machine part. For the axial setting of the device, an adjusting spanner can be applied to the engagement surface. In order to disengage a locking screw, the bushing can be twisted in the machine part, thus effecting the axial adjustment of the bushing. Another possibility for axial adjustment of a cell wheel is also disclosed in DE 195 44 237 A1.

SUMMARY OF THE INVENTION

A primary object of the invention is to prevent these disadvantages for metering units of the construction type as described in WO 2013/186175 A1 and to enable a simply and cost-effectively realizable adjustability of the rotating metering disks or of their interaction with the corresponding opposing surfaces in the housing to different grain sizes and/or grain contours. In particular, the metering units should be employable for different grain types, grain sizes, and/or grain contours without great logistic effort such that the respectively best possible separation quality can be obtained when sowing different grain types, grain sizes, and/or grain contours. Thereby, it is also intended to maintain the attainable release precision and/or the grain spacing in a volumetric grain conveyance to such an extent that the grain metering approximates or ideally reaches a single grain metering with regard to its separation quality, while at the same time a high grain volume flow should be enabled, and this preferably with a structure that continues to be simple and not very prone to failure and with a simple mode of operation, as is characteristic of volumetrically metering seed-drill machines.

For achieving the stated object, the invention proposes a metering unit for granular material, such as seeds, fertilizer, or the like, which metering unit has a conveyor disk driven by a drive motor and rotating approximately concentrically to an inner cover surface of a housing, said inner cover surface taking approximately the form of a circular path and/or of a circle segment. The drive motor can be an electric motor, for instance, or a hydrostatic drive or the like. Other variants of a drive motor are generally also possible. The conveyor disk has at least one shoulder or at least one recess at its circumference or outer periphery for the reception of at least one grain to be separated via at least one revolution of the conveyor disk. In the interaction with a groove-shaped and/or slanted profile of the inner cover surface, the at least one shoulder or the at least one recess forms a conveyor pocket for conveying one grain or a plurality of grains in the direction toward an outlet opening extending approximately tangentially to the inner cover surface. In order to vary an axial distance to the inner cover surface and/or a width of the conveyor pocket in axial direction, the conveyor disk, which is rotationally fixedly connected with the drive motor, is adjustable in the axial direction of the drive motor. For this purpose, it is in particular possible to adjust or shift the entire drive motor together with the rotationally fixedly connected conveyor disk within the housing in axial direction in relation to its rotational axis, thus also shifting the conveyor disk coupled therewith within the housing. With this shift, a gap size changes between a beveled edge of the conveyor disk and a corresponding opposing surface at the inner cover surface of the housing, in which the conveyor disk rotates, thus in turn providing for an adjustability to different grain sizes.

The drive motor can selectively be adjusted with regard to its position within the metering unit by motor—for instance by an electric motor—or manually. An adjustment by an electric motor can comprise a small servomotor, which allows a precise adjustability via a gearwheel-worm wheel transmission, for instance. Other drive variants are also conceivable in this context. The adjustment unit for the axial adjustment of the position of the drive motor in the housing preferably provides a self-locking effect, which can be present in the instance of the mentioned gearwheel-worm wheel transmission, for example, or also in the instance of an adjustment unit with a spindle drive.

A further variant of the metering unit according to the invention provides that a plurality of such metering units of the same type are coupled with a central control unit and are adjustable independently of each other or together. In this manner, it is possible to carry out a central adjustment of all metering units of a sowing machine, or also a specific adjustment of individual metering units from a drivers platform of the sowing machine, for instance.

The metering unit with the conveyor disk rotating therein can be, in particular, a unit of the construction type as is described in WO 2013/186175 A1. For such metering units, the invention supplies a simple and cost-effective adjustment to different grain sizes and/or grain contours. By the adjustability of the drive unit, it is in particular possible to adjust the metering wheel, which is coupled with the electric drive unit, in a simple manner and with very little effort to different grain types, grain sizes, and/or grain contours without requiring a conversion or without having to respectively replace the complete conveyor disks. When sowing different grain types, grain sizes, and/or grain contours, the respectively best possible separation quality can be ensured by the adjustable gap size. In this way it is additionally possible to maintain the respectively realizable release precision and/or the grain distances to be realized in a volumetric grain conveyance to such an extent that the grain metering thereby approximates or ideally reaches a single grain metering with regard to its separation quality, while a high grain volume flow is enabled at the same time. At the same time, metering units are thus provided that are structured in a simple manner and that are hardly prone to failure.

The mentioned metering unit for granular material such as seeds, fertilizer, or the like, which is in particular known from WO 2013/186175 A1, is equipped with a conveyor disk rotating within a housing of the metering unit and approximately concentrically to an inner cover surface of a housing, said inner cover surface taking approximately the form of a circular path and/or of a circle segment, which conveyor disk has at least one shoulder or one recess at its circumference or, as the case may be, at its outer periphery, for the reception of at least one grain to be separated via at least one revolution of the conveyor disk. In the interaction with a groove-shaped profile of the inner cover surface, the at least one shoulder or the at least one recess forms a conveyor pocket for conveying one grain or a plurality of grains in the direction toward an outlet opening extending approximately tangentially to the inner cover surface.

The at least one shoulder or the at least one recess at the outer periphery of the conveyor disk can be adjusted in its spacing to a corresponding groove-shaped opposing surface at the inner cover surface of the housing. According to this manifestation, it is possible to realize a gap of a defined gap size. The possibility for adjusting the gap can be carried out by adjusting the motor unit in an axial adjusting direction. The regulation of the distance between the conveyor disk and the opposing surface of the inner cover surface of the housing can be performed with little effort such that the gap is adjustable to the most diverse grain types, grain sizes, and/or grain contours. As described in the beginning, a separate conversion of the metering unit is no longer required. The system can thus be flexibly adjusted to the respective grain types, grain sizes, and/or grain contours, and at the same time maintain the requested quality of the release precision and/or the grain spacing to be realized in a volumetric grain conveyance. In this manner, the grain metering can approximate or ideally even reach a single grain metering with regard to its separation quality. At the same time, a high grain volume flow is also realized with the system.

A further development of the invention provides that at least one shoulder or the at least one recess is adjustable at parallel surfaces and/or at surfaces merging into each other and/or via a defined angle, in which context the at least one shoulder or the at least one recess results from the outer periphery of the conveyor disk in relation to the groove-shaped opposing surface at the inner cover surface of the housing. It is clear from this embodiment that the gap for conveying the granular material can take form in the most diverse constructive designs. In the variants running in a parallel and/or in a slanted manner, the profile of the conveyor disk corresponds exactly or approximately to the profile of the opposing surface of the inner cover surface of the housing. The orientation of the gap or of the at least one shoulder or of the at least one recess at the outer periphery of the conveyor disk in relation to the groove-shaped opposing surface at the inner cover surface of the housing via a corner normally has a defined angle. Preferably, the defined angle corresponds to a value of 90°. However, it is also conceivable that the angle can take any other values via the corner profile.

For such metering units, the invention supplies a simple and cost-effective adjustment to different grain sizes and/or grain contours. By the adjustability of the drive unit, it is in particular possible to adjust the metering wheel, which is coupled with the electric drive unit, in a simple manner and with very little effort to different grain types, grain sizes, and/or grain contours without requiring a conversion or without having to respectively replace the complete conveyor disks. When sowing different grain types, grain sizes, and/or grain contours, the respectively best possible separation quality can be ensured by the adjustable gap size. In this way it is additionally possible to maintain the respectively realizable release precision and/or the grain spacing to be realized in a volumetric grain conveyance to such an extent that the grain metering thereby approximates or ideally reaches a single grain metering with regard to its separation quality, while a high grain volume flow is enabled at the same time.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

DETAILED DESCRIPTION OF THE INVENTION

The same or equivalent elements of the invention are designated by identical reference characters. Furthermore and for the sake of clarity, only the reference characters relevant for describing the respective figure are provided. It should be understood that the detailed description and specific examples of the device and method according to the invention, while indicating preferred embodiments, are intended for purposes of illustration only and are not intended to limit the scope of the invention.

Figure 1:
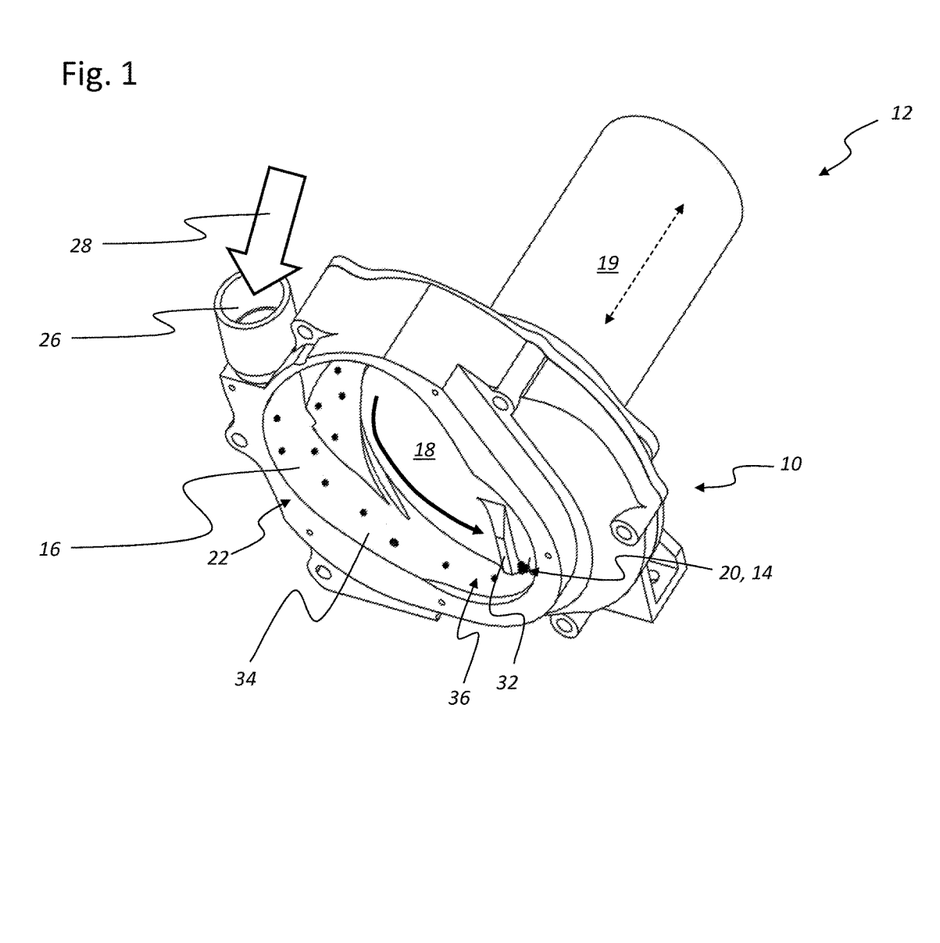
FIG. 1 is a perspective view of a metering unit with portions removed to show a conveyor disk rotating relative to an inner cover surface in a housing of the metering unit.

The invention described in the following by means of the FIGS. 1 to 3 comprises a conveyor disk 18 rotating within a housing 10 of a metering unit 12 for granular material such as seeds 14, fertilizer, or the like, and rotating approximately concentrically to an inner cover surface 16 of the housing 10, said inner cover surface 16 taking approximately the form of a circular path and/or of a circle segment, which conveyor disk 18 has at least one shoulder or one recess 20 at its outer periphery 22 for the reception of at least one grain 14 to be separated via at least one revolution of the conveyor disk 18. The distances of the disk 18 from an opposed surface of the inner cover surface 16 of the housing 10 can be varied by the adjustment of a motor unit 19 (indicated by the double arrow in FIG. 1).

The metering unit 12, in which the conveyor disk 18 rotates, can be, in particular, a unit of the construction type as is described in WO 2013/186175 A1. The schematic perspective view of FIG. 1 illustrates the structure of such a metering unit 12, which can serve, in particular, as sowing unit of a distribution machine or of a sowing machine. The metering unit 12 comprises a housing 10 with an inner cover surface 16 taking approximately the form of a circular path and/or of a circle segment at least in sections and with an inlet opening 26 for an airflow 28 and granular material or seeds 14 being conveyed therein. For the granular material being carried in the airflow 28, or, as the case may be, for the seeds being conveyed therein, the metering unit 12 furthermore comprises the conveyor disk 18, which rotates concentrically in the housing 10, and also an outlet opening, which is not clearly discernible in FIG. 1, and which extends approximately tangentially to the inner cover surface 16 and releases the seeds or the granular material largely evenly to a seed line, a conveyor line, or the like. In the shown exemplary embodiment, the conveyor disk 18 can have one, two, or a plurality of evenly spaced entrainment shoulders 32 and also recesses 20 arranged immediately thereat for entraining granular material or seeds, as the case may be.

The grains being carried in the airflow 28 are guided through the curved inflow of the inlet opening 26 into the interior space of the housing 10, in which the rotating conveyor disk 18 forms a sort of metering device for the equidistant release of the grains in direction toward and out of the outlet. The airflow 28 provides for the grains to move along the inner cover surface 16 and first along the curved wall surface 34. As the inner cover surface 16 has an inclined housing surface 36 or else a differently formed groove-shaped structure in the further course in direction of the outlet opening, the dimensions of which inclined housing surface 36 approximately correspond to the size of the individual grains, the grains are pressed between the wall surface 34, along the inclined housing surface 36 and in direction of the outlet opening toward the conveyor disk 18 in the further course of movement, where, however, between the shoulder 32 and the inclined housing surface 36 only one single grain 14 at a time can be accommodated. This is also achieved by the groove-shaped structure or by the inclined housing surface 36 tapering in the direction toward the outlet opening in direction of rotation of the conveyor disk 18. Since the groove-shaped tapering of the inner cover surface 16, in addition, tangentially leads into the outlet opening in the direction of rotation of the conveyor disk 18, individual grains 14 are respectively released at evenly spaced distances through the outlet opening.

Figure 2A:
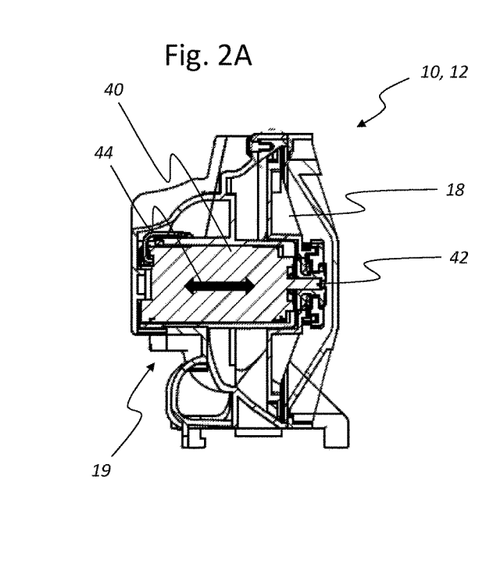
FIG. 2A is a cross-sectional view of the metering unit taken generally along line A-A of FIG. 2B.
Figure 2B:
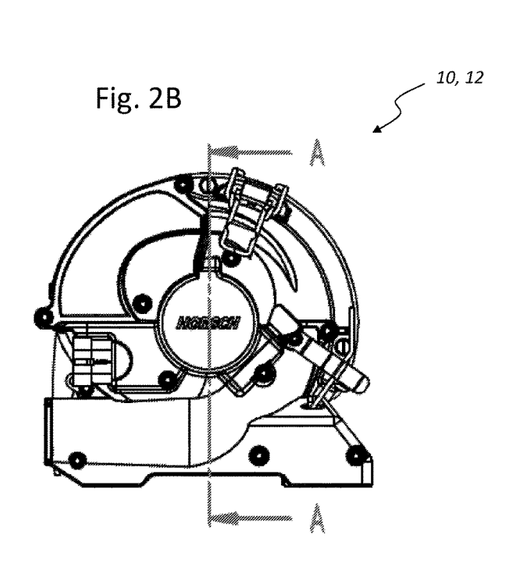
FIG. 2B is a side elevational view of the metering unit.

The schematic lateral view of FIG. 2B and the longitudinal cross-section of FIG. 2A along the section line A-A of FIG. 2A show the structure of the metering unit 12 with the rotating conveyor disk 18, which is rotatably connected with and rotated by the motor unit 19. In the exemplary embodiment shown, the motor unit 19 comprises an electric drive motor 40, which has a cylindrical motor housing and a drive shaft 42 directed toward the conveyor disk 18. The conveyor disk 18 is detachably, however, rotationally fixedly attached at the drive shaft 42. In order to be able to adjust the conveyor disk 18 in relation to the housing 10, the drive motor 40 is adjustable together with the drive shaft 42 and thus with the conveyor disk 18 in axial direction 44, for instance by means of a suitable spindle drive, which comprises a separate adjusting motor.

This separate adjusting motor or adjusting drive, which is not described in detail, can comprise an electric drive, for instance, but it can also have other drive variants. It is also not imperative that the drive motor for the rotating metering disk takes the form of an electric motor. Other drive variants are also possible in this context, for instance a hydro motor or the like.

Figure 2C:
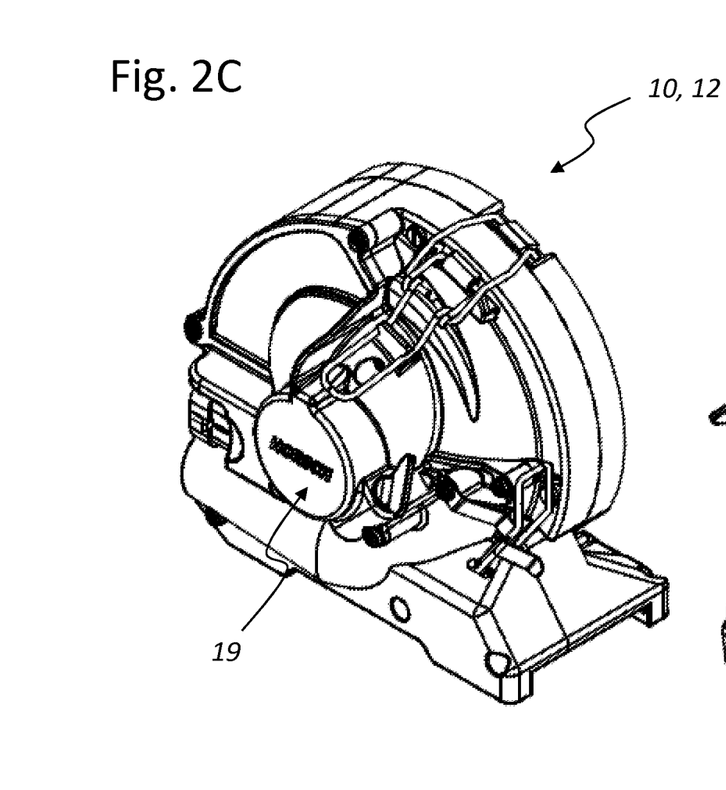
FIG. 2C is a perspective view of the metering unit.
Figure 2D:
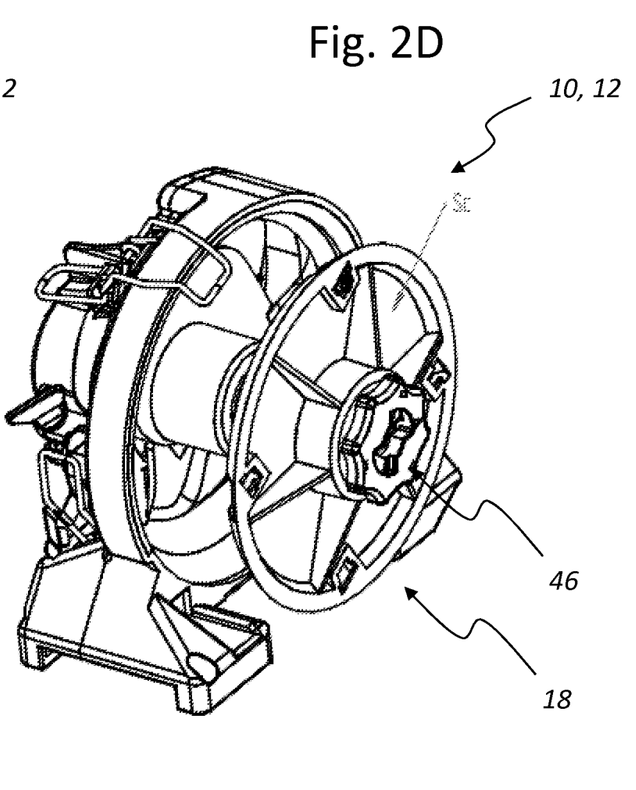
FIG. 2D is an exploded perspective view of the metering unit with portions removed and showing the conveying disk exploded away from a drive motor.

The schematic perspective views of the FIGS. 2C and 2D illustrate once more the structure of an embodiment variant of the metering unit 12 according to the invention. The schematic perspective view of FIG. 2C shows the metering unit 12 from the side of the drive 19. The schematic perspective view of FIG. 2D shows the housing 10 with the front cover removed and the conveyor disk 18 that is detachable by means of a central shutter 46. Such a central shutter 46 can be useful for facilitating a quick replacement of the conveyor disk 18 with a differently designed disk for other seeds.

Figure 3A:
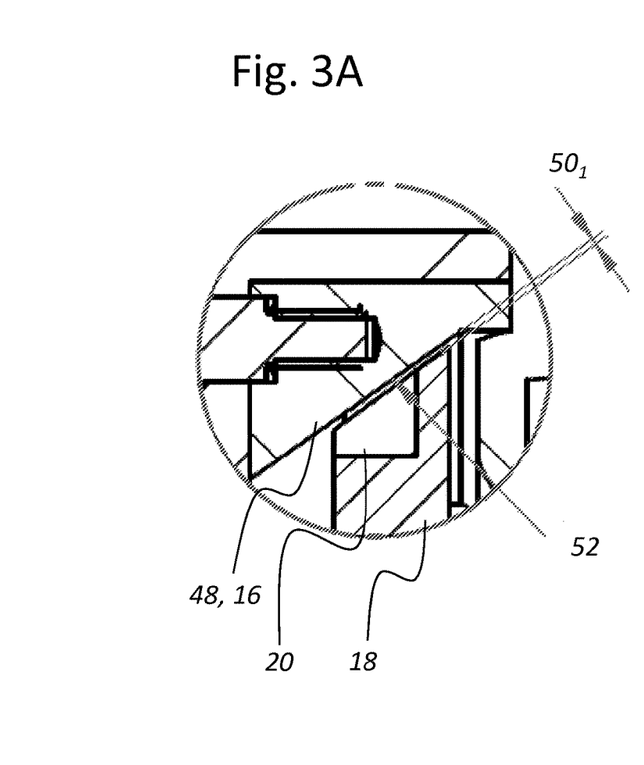
FIG. 3A shows an enlarged and fragmentary view of an adjustable gap at a first spacing between the rotating conveyor disk and the inner cover surface of the housing of the metering unit.
Figure 3B:
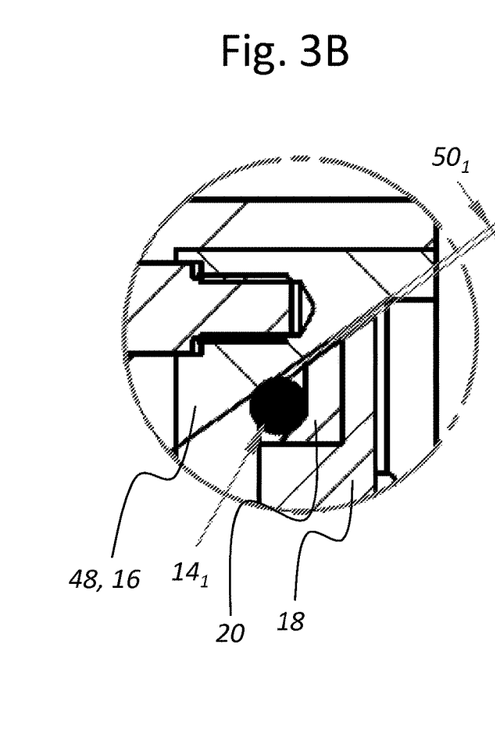
FIG. 3B is a view similar to FIG. 3A showing a first seed positioned in a pocket of a first size formed with the adjustable gap in the first spacing.
Figure 3C:
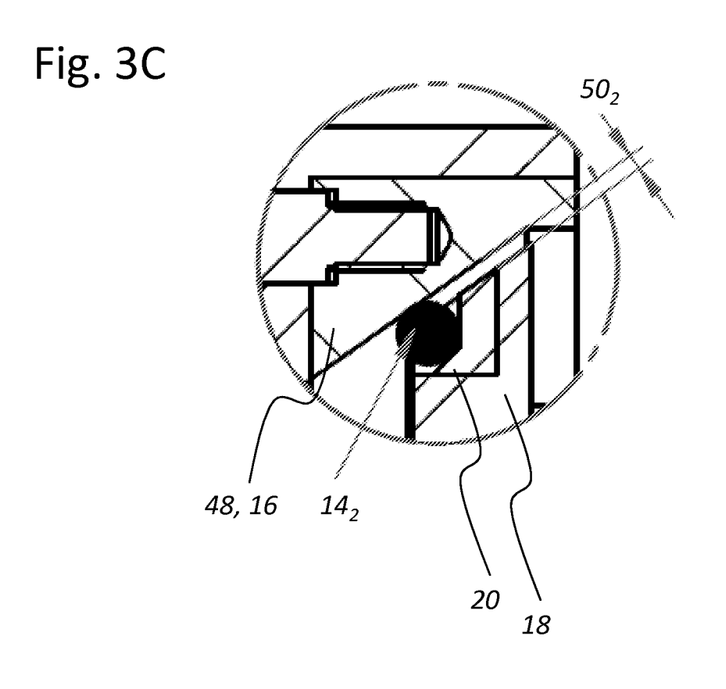
FIG. 3C is a view similar to FIG. 3A showing a second seed positioned in the pocket of a second size formed with the adjustable gap in a second spacing.

The schematic detail sections of FIG. 3 show different axial states of adjustment of the conveyor disk 18, the distance of which from the opposing surface 48 of the inner cover surface 16 of the housing 10 defines a gap size 50 of a gap 52. FIG. 3B shows the reception of a grain 141 with a first diameter. The grain 141 is located in a recess 20, with a first gap size 501 being set by the adjustment of the motor unit 19 in axial adjusting direction 44.

FIG. 3C shows the reception in the equally sized recess 20 of a grain 142 with a second diameter that is greater than the first diameter of the grain 141 according to FIG. 3B. Here, the grain 142 is also located in the recess 20, however, with a larger, second gap size 502, which is greater than the first gap size 501, being set by the adjustment of the motor unit 19 in axial adjusting direction 44. In this manner it is possible to achieve a quick adjustment to different grain sizes 141, 142 by a simple axial adjustment of the motor unit 19.

By modifying the gap size 50, the resulting separating space of the metering unit is consequently modified, which separating space is respectively available to the individual grains due to the size of the reception and due to their contour. In addition, the manner shown enables providing for tolerances both with regard to the dimensional accuracy of the different components of the unit 12 and with regard to the respective grain diameters being sowed.

Figure 4A:
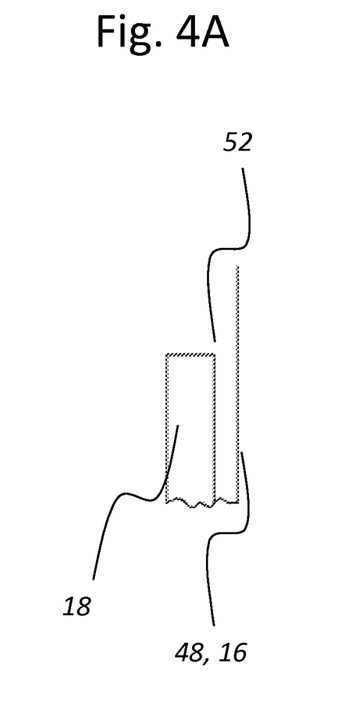
FIG. 4A-4C show three schematic and fragmentary views of variations of an adjustable gap between the rotating conveyor disk and an inner cover surface of the housing of the metering unit.
Figure 4B:
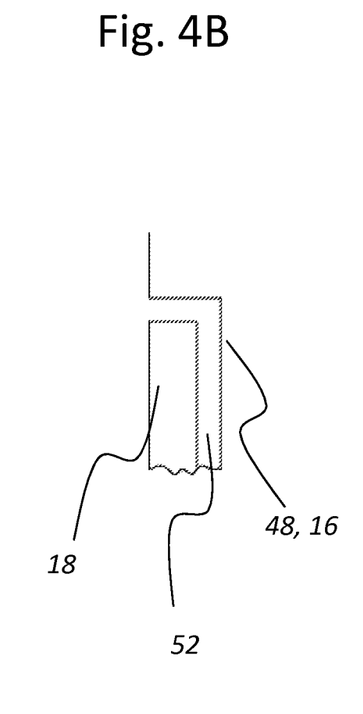
Figure 4C:
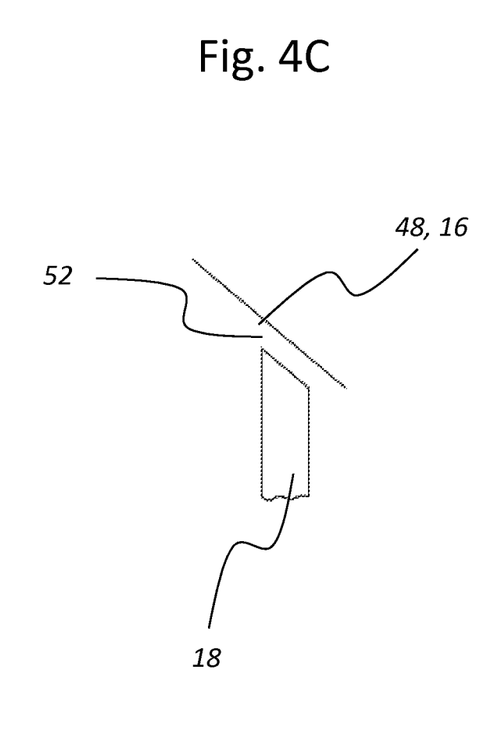

Other possibilities for setting a gap 52 between the rotating conveyor disk 18 and an inner cover surface 16 of the housing 10 of the metering unit are illustrated in the FIGS. 4A to 4C. The figures show how the gap size 50 can be set in a diversity of constructional designs.

According to FIG. 4A, a gap 52 can be set between two surfaces that are arranged in parallel, facing each other. These surfaces are, on the one hand, the inner cover surface or, as the case may be, the opposing surface 16, 48 of the metering unit and a flat or profiled front end of the conveyor disk 18. The grain (not illustrated here) can be confined on two sides by the two surfaces arranged in parallel and facing each other, with the gap size 50 being settable by the adjustment of the motor unit in axial adjusting direction. The gap 52 can thus be selectively adjusted to the respective grain sizes and/or grain contours. Along with the adjustment to an infinite variety of grain sizes and/or grain contours, modifying the gap 52 at the same time also results in modifying the separating space.

The gap 52 can alternatively be set via a corner-shaped recess according to FIG. 4B, thereby additionally confining the grain from a further side. In a preferred embodiment variant, the grain can also be guided by a defined angle, preferably by 90°. The angle or the corner can alternatively take other dimensions, as well. The setting of the gap size 50 is carried out by an adjustment of the motor unit in an axial adjusting direction, as previously described.

In a further embodiment according to FIG. 4C, the gap 52 can also be set via a slanted surface. The gap 52 results between the inner cover surface or, as the case may be, the opposing surface 16, 48 of the metering unit and the conveyor disk 18. The incline of the inner cover surface or, as the case may be, of the opposing surface 16, 48 of the metering unit, corresponds exactly to the incline of the conveyor disk 18. In this embodiment it is likewise possible to adjust the gap to an infinite variety of grain sizes by the adjustment of the motor unit.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A metering unit for granular material includes a conveyor disk driven by a drive motor and rotating approximately concentrically to an inner cover surface of a housing, said conveyor disk having at least one shoulder or at least one recess formed at a periphery of said conveyor disk for the reception of at least one grain to be separated through rotation of said conveyor disk, wherein, in the interaction with said inner cover surface, said at least one recess or said at least one shoulder forms a conveyor pocket for conveying one grain or a plurality of grains in a direction toward an outlet opening, wherein said drive motor and said conveyor disk, which is rotationally fixedly connected with said drive motor, are shiftable in an axial direction along a rotational axis of said drive motor for varying an axial spacing between said at least one recess or said at least one shoulder and said inner cover surface to adjust a size of said conveyor pocket.

2. The metering unit as in claim 1, in which said drive motor is shiftable in the axial direction by motor or manually.

3. The metering unit as in claim 2, in which an adjustment unit for the axial shifting of said drive motor in the housing has a self-locking effect.

4. The metering unit as in claim 3, in which said adjustment unit comprises a spindle drive.

5. The metering unit as in claim 1, in which the axial spacing of said at least one shoulder or said at least one recess at said periphery of said conveyor disk is adjustable relative to a corresponding groove-shaped opposing surface of said inner cover surface of said housing.

6. The metering unit as in claim 1, in which a plurality of said metering units are coupled with a central control unit and are adjustable independently of each other or together.

7. A metering unit for granular material including a conveyor disk driven by a drive motor and rotating approximately concentrically to an inner cover surface of a housing, said inner cover surface taking approximately the form of a circular path or of a circle segment, said conveyor disk has at least one shoulder or one recess at a periphery of the conveyor disk for the reception of at least one grain to be separated via at least one revolution of said conveyor disk, wherein, in the interaction with a groove-shaped or slanted profile of said inner cover surface, said at least one shoulder or said at least one recess forms a conveyor pocket for conveying one grain or a plurality of grains in a direction toward an outlet opening extending approximately tangentially to said inner cover surface, wherein said conveyor disk, which is rotationally fixedly connected with said drive motor, is adjustable in an axial direction of said drive motor for varying an axial distance to said inner cover surface or a width of said conveyor pocket, wherein said drive motor is adjustable or shiftable within said housing along a rotational axis of said drive motor and accordingly in an axial direction to the rotational axis of the said drive motor.

8. The metering unit as in claim 7, in which said drive motor is adjustable or shiftable within said housing along the rotational axis of said drive motor by motor or manually.

9. The metering unit as in claim 8, in which an adjustment unit for the axial adjustment or shifting of said drive motor in the housing has a self-locking effect.

10. The metering unit as in claim 9, in which said adjustment unit comprises a spindle drive.

11. The metering unit as in claim 7, in which the spacing of said at least one shoulder or said at least one recess at said periphery of said conveyor disk is adjustable or shiftable relative to a corresponding groove-shaped opposing surface of said inner cover surface of said housing.

12. The metering unit as in claim 11, in which said at least one shoulder or said at least one recess is settable at parallel surfaces or via a defined angle or at a slanted surface.

13. The metering unit as in claim 7, in which a plurality of said metering units are coupled with a central control unit and are adjustable independently of each other or together.

14. A plurality of metering units for granular material coupled with a central control unit, each of said metering units comprising a conveyor disk driven by a drive motor and rotating approximately concentrically to an inner cover surface of a housing, said conveyor disk having at least one shoulder or at least one recess formed at a periphery of said conveyor disk for the reception of at least one grain to be separated through rotation of said conveyor disk, wherein, in the interaction with said inner cover surface, said at least one recess or said at least one shoulder forms a conveyor pocket for conveying one grain or a plurality of grains in a direction toward an outlet opening, wherein said drive motor and said conveyor disk, which is rotationally fixedly connected with said drive motor, are shiftable in an axial direction along a rotational axis of said drive motor for varying an axial spacing between said at least one recess or said at least one shoulder and said inner cover surface to adjust a size of said conveyor pocket; said central control unit operable to independently shift said drive motor and said conveyor disk of each of said plurality of metering units along the rotational axis of said drive motor to independently adjust the spacing between said at least one recess or said at least one shoulder and said inner cover surface of each of said plurality of metering units.

* * * * *